United States Patent
Kato et al.

(10) Patent No.: US 10,556,987 B2
(45) Date of Patent: Feb. 11, 2020

(54) POLYCARBONATE RESIN

(71) Applicant: MITSUBISHI GAS CHEMICAL COMPANY, INC., Tokyo (JP)

(72) Inventors: Noriyuki Kato, Tokyo (JP); Mitsuteru Kondo, Tokyo (JP); Munenori Shiratake, Tokyo (JP); Kentaro Ishihara, Tokyo (JP); Koji Hirose, Tokyo (JP); Shinya Ikeda, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 41 days.

(21) Appl. No.: 15/769,010

(22) PCT Filed: Nov. 2, 2016

(86) PCT No.: PCT/JP2016/082613
§ 371 (c)(1),
(2) Date: Apr. 17, 2018

(87) PCT Pub. No.: WO2017/078073
PCT Pub. Date: May 11, 2017

(65) Prior Publication Data
US 2019/0055351 A1    Feb. 21, 2019

(30) Foreign Application Priority Data

Nov. 4, 2015    (JP) .................. 2015-216977

(51) Int. Cl.
| | |
|---|---|
| C08G 64/06 | (2006.01) |
| G02B 3/00 | (2006.01) |
| G02B 1/04 | (2006.01) |
| C08G 64/30 | (2006.01) |
| C08J 5/18 | (2006.01) |

(52) U.S. Cl.
CPC ........... *C08G 64/06* (2013.01); *C08G 64/305* (2013.01); *C08J 5/18* (2013.01); *G02B 1/04* (2013.01); *G02B 1/041* (2013.01); *G02B 3/00* (2013.01); *C08J 2369/00* (2013.01)

(58) Field of Classification Search
USPC ................................................ 528/196, 198
See application file for complete search history.

(56) References Cited

U.S. PATENT DOCUMENTS

| | | |
|---|---|---|
| 2012/0123083 A1 | 5/2012 | Nunome et al. |
| 2015/0285954 A1 | 10/2015 | Ishizuka et al. |

FOREIGN PATENT DOCUMENTS

| | | |
|---|---|---|
| JP | 2008-111047 | 5/2008 |
| JP | 2011-026557 | 2/2011 |
| JP | 2014-185325 | 10/2014 |
| WO | 2011/010741 | 1/2011 |
| WO | 2014/073496 | 5/2014 |

OTHER PUBLICATIONS

International Search Report issued in International Bureau of WIPO Patent Application No. PCT/JP2016/082613, dated Dec. 6, 2016.

*Primary Examiner* — Terressa Boykin
(74) *Attorney, Agent, or Firm* — Greenblum & Bernstein, P.L.C.

(57) ABSTRACT

The present invention provides a polycarbonate resin containing a repeating unit represented by formula (A) in the amount of 1-99.5 wt %, the polycarbonate resin also containing an oligomer having a specific structure in a total amount that constitutes a content of 2.5 wt % or lower.

Formula (A)

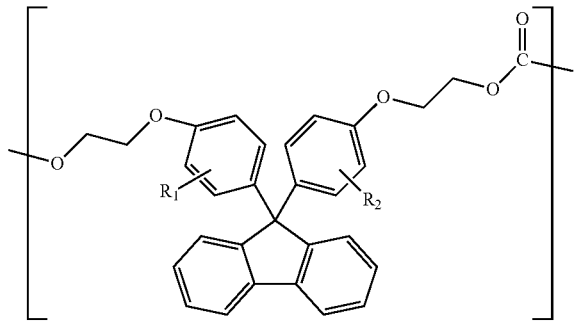

(In formula (A), $R^1$ and $R^2$ each independently represent a hydrogen atom, a phenyl group, a C1-6 alkyl group, or a C1-6 alkyloxy group).

7 Claims, 3 Drawing Sheets

POLYCARBONATE RESIN

TECHNICAL FIELD

The present invention relates to a polycarbonate resin with high thermal stability.

BACKGROUND ART

Recent popularization of electronic equipments such as digital cameras, smartphones and tablets are increasing the demand for small-sized camera modules. Plastic lenses rather than glass lenses are favorably used in such camera modules. This is because plastic lenses are adaptable to various shapes such as thin lenses and aspherical lenses, inexpensive, and can easily be mass-produced by injection molding.

Highly functional resins have been developed for optical lenses as substitutes for glass and various monomers have been studied as the starting materials thereof. While bisphenol A has mainly served as such a starting material before, polymers made with monomers having fluorene skeletons, for example, 9,9-bis(4-(2-hydroxyethoxy)phenyl)fluorene (BPEF), have been developed (Patent Literatures 1 and 2). Although such resins having fluorene skeletons have high refractive index and are favorable as an optical material, a polycarbonate resin has much larger thermal expansion coefficient (linear expansion coefficient) than glass, which may cause strain (for example, residual strain after molding). Accordingly, a polycarbonate resin which is useful as an optical material and whose thermal expansion coefficient (linear expansion coefficient) is small has been required.

PRIOR ART DOCUMENTS

Patent Documents

Patent Document 1: International Publication No. WO2014/073496
Patent Document 2: International Publication No. WO2011/010741

SUMMARY OF THE INVENTION

Problems to be Solved by the Invention

The present invention has an objective of providing a polycarbonate resin which is useful as an optical material and whose thermal expansion coefficient (linear expansion coefficient) is small.

Means for Solving the Problems

The present inventors have gone through keen studies, and as a result of which found that, a polycarbonate resin with small thermal expansion coefficient (that is, a small linear expansion coefficient) and high thermal stability can be obtained by suppressing the content of an oligomer having a specific structure contained in the polycarbonate resin to a specific level. Thus, the present invention is as follows.

<1> A polycarbonate resin comprising a repeating unit represented by Formula (A) below in an amount of 1-99.5 wt %, wherein oligomers represented by Formulae (1)-(4) below are contained in a total volume of 2.5 wt % or less:

Formula (A)

(in Formula (A), $R_1$ and $R_2$ each independently represent a hydrogen atom, a phenyl group, a C1-6 alkyl group or a C1-6 alkyloxy group)

Formula (1)

(in Formula (1), $R_1$ and $R_2$ each independently represent a hydrogen atom, a phenyl group, a C1-6 alkyl group or a C1-6 alkyloxy group, and n represents an integer of 1-4)

<2> The polycarbonate resin according to <1> above, wherein $R_1$ and $R_2$ in Formula (A) each independently represent a hydrogen atom or a phenyl group.

Formula (2)

(in Formula (2), $R_1$ and $R_2$ each independently represent a hydrogen atom, a phenyl group, a C1-6 alkyl group or a C1-6 alkyloxy group, and m represents an integer or 1-6)

<3> The polycarbonate resin according to <1> or <2> above, comprising the oligomers represented by Formulae (1)-(4) above in a total volume of 0.6 wt %/o or more.

<4> The polycarbonate resin according to any one of <1> to <3> above, wherein the total content of the linear oligomers represented by Formulae (1)-(3) above is 1.5 wt % or less, and the content of the cyclic oligomer represented by Formula (4) above is 0.6 wt % or less.

<5> The polycarbonate resin according to any one of <1> to <4> above, further comprising a repeating unit represented by Formula (B) below:

Formula (3)

(in Formula (3), $R_1$ and $R_2$ each independently represent a hydrogen atom, a phenyl group, a C1-6 alkyl group or a C1-6 alkyloxy group, and l represents an integer of 1-5)

Formula (B)

Formula (4)

(in Formula (4), $R_1$ and $R_2$ each independently represent a hydrogen atom, a phenyl group, a C1-6 alkyl group or a C1-6 alkyloxy group, and k represents an integer of 2-4).

<6> The polycarbonate resin according to <5> above, comprising the repeating unit represented by Formula (A) above and the repeating unit represented by Formula (B) above at a molar ratio of 10:90 to 90:10.

<7> The polycarbonate resin according to any one of <1> to <6> above, wherein a linear expansion coefficient is $6.5 \times 10^{-5}$ to $7.0 \times 10^{-5}/°$ C.

<8> An optical film comprising the polycarbonate resin according to any one of <1> to <7> above.

<9> An optical lens comprising the polycarbonate resin according to any one of <1> to <7> above.

<10> A method for adjusting a total volume of oligomers represented by Formulae (1)-(4) below contained in a polycarbonate resin to be 2.5 wt % or less, wherein the polycarbonate resin contains a repeating unit represented by Formula (A) below in an amount of 1-99.5 wt %:

Formula (A)

(in Formula (A), $R_1$ and $R_2$ each independently represent a hydrogen atom, a phenyl group, a C1-6 alkyl group or a C1-6 alkyloxy group)

Formula (1)

(in Formula (1), $R_1$ and $R_2$ each independently represent a hydrogen atom, a phenyl group, a C1-6 alkyl group or a C1-6 alkyloxy group, and n represents an integer of 1-4)

Formula (2)

(in Formula (2), $R_1$ and $R_2$ each independently represent a hydrogen atom, a phenyl group, a C1-6 alkyl group or a C1-6 alkyloxy group, and m represents an integer or 1-6)

Formula (3)

(in Formula (3), $R_1$ and $R_2$ each independently represent a hydrogen atom, a phenyl group, a C1-6 alkyl group or a C1-6 alkyloxy group, and l represents an integer of 1-5)

Formula (4)

(in Formula (4), $R_1$ and $R_2$ each independently represent a hydrogen atom, a phenyl group, a C1-6 alkyl group or a C1-6 alkyloxy group, and k represents an integer of 2-4).

Advantageous Effect of the Invention

Since the polycarbonate resin of the present invention has a low linear thermal expansion coefficient and the shrinkage after molding is small, a stable molded article can be obtained by injection molding.

EMBODIMENTS FOR CARRYING OUT THE INVENTION

Hereinafter, the present invention will be described in detail.

The present invention is a polycarbonate resin comprising 1-99.5 wt % of a repeating unit represented by Formula (A) above, wherein oligomers represented by Formulae (1)-(4) below are contained in a total volume of 2.5 wt % or less.

Formula (1)

In Formula (1), $R_1$ and $R_2$ each independently represent a hydrogen atom, a phenyl group, a C1-6 alkyl group or a C1-6 alkyloxy group, preferably a hydrogen atom or a phenyl group; and n represents an integer of 1-4, preferably an integer of 1-3.

As to $R_1$ and $R_2$, preferable examples of the C1-6 alkyl group include a methyl group, an ethyl group, a propyl group, an isopropyl group, a butyl group, an isobutyl group, a sec-butyl group, a tert-butyl group, a cyclopropyl group, a cyclobutyl group, a cyclopentyl group and a cyclohexyl group.

As to $R_1$ and $R_2$, preferable examples of the C1-6 alkyloxy group include a methoxy group, an ethoxy group, a propoxy group, an isopropoxy group, a butoxy group, an isobutoxy group, a sec-butoxy group, a tert-butoxy group, a cyclopropoxy group, a cyclobutoxy group and a cyclopentoxy group.

Formula (2)

In Formula (2), $R_1$ and $R_2$ each independently represent a hydrogen atom, a phenyl group, a C1-6 alkyl group or a C1-6 alkyloxy group, preferably a hydrogen atom or a phenyl group; and m represents an integer of 1-6, preferably an integer of 1-3. Herein, $R_1$ and $R_2$ in Formula (2) are synonymous with $R_1$ and $R_2$ in Formula (1).

Formula (3)

In Formula (3), $R_1$ and $R_2$ each independently represent a hydrogen atom, a phenyl group, a C1-6 alkyl group or a C1-6 alkyloxy group, preferably a hydrogen atom or a phenyl group; and l represents an integer of 1-5, preferably an integer of 1-3. Herein, $R_1$ and $R_2$ in Formula (3) are synonymous with $R_1$ and $R_2$ in Formula (1).

Formula (4)

In Formula (4), $R_1$ and $R_2$ each independently represent a hydrogen atom, a phenyl group, a C1-6 alkyl group or a C1-6 alkyloxy group, preferably a hydrogen atom or a phenyl group; and k represents an integer of 2-4. Herein, $R_1$ and $R_2$ in Formula (4) are synonymous with $R_1$ and $R_2$ in Formula (1).

The polycarbonate resin of the present invention preferably contains the oligomers represented by Formulae (1)-(4) above in a total volume of 0.6 wt % or more. More preferably, the polycarbonate resin of the present invention contains the oligomers represented by Formulae (1)-(4) above in a total volume of 0.8-2.5 wt %, still more preferably 1.0-2.2 wt %, and particularly preferably 1.0-2.0 wt %.

Further preferably, in the polycarbonate resin of the present invention, the total content of the linear oligomers represented by Formulae (1)-(3) above is 1.5 wt % or less while the content of the cyclic oligomer represented by Formula (4) above is 0.6 wt % or less.

According to the present invention, a content of an oligomer can be measured by employing the method described in the examples below.

The present inventors found that a linear expansion coefficient can be made low by containing the oligomers represented by Formulae (1)-(4) above in a total volume of 2.5 wt % or less, and that as a result of which a polycarbonate resin with high thermal stability can be obtained.

The oligomers represented by Formulae (1)-(4) above can be made into a total volume of 2.5 wt % or less, for example, by a method in which the molar ratio of the starting materials (diphenyl carbonate/9,9-bis(4-(2-hydroxyethoxy)phenyl)fluorene) is adjusted, a method in which the reaction temperature is adjusted, a method in which catalyst species is used for adjustment, or a method in which the amount of catalyst is adjusted.

The molar ratio of the starting materials (diphenyl carbonate/9,9-bis(4-(2-hydroxyethoxy)phenyl)fluorene) is preferably 1.05 or less.

A polycarbonate resin of the present invention has a linear expansion coefficient of preferably $6.5 \times 10^{-5}$ to $7.0 \times 10^{-5}/°$ C., more preferably $6.6 \times 10^{-5}$ to $6.8 \times 10^{-5}/°$ C. If the linear expansion coefficient is less than $6.5 \times 10^{-5}/°$ C., the bonding performance with other resin to be laminated with may be deteriorated when used as an optical lens or an optical film, whereas if the linear expansion coefficient exceeds $7.0 \times 10^{-5}/°$ C., the heat resistance may be deteriorated and thermal deformation of the molded article may be caused upon use. In addition, performance as an optical material may be deteriorated. For example, resolution of the lens may be deteriorated when molded as an optical lens.

According to the present invention, a linear expansion coefficient may be determined by employing the method described in the examples below.

The polycarbonate resin of the present invention comprises the repeating unit represented by Formula (A) above preferably in an amount of 50-99.0 wt % and more preferably in an amount of 80-99.0 wt %.

Herein, the repeating unit represented by Formula (A) above is a structural unit derived from a compound represented by Formula (A) below. In the polycarbonate resin of the present invention, the structural units are coupled via a carbonate bond.

Formula (A′)

In Formulae (A) and (A), $R_1$ and $R_2$ each independently represent a hydrogen atom, a phenyl group, a C1-6 alkyl group or a C1-6 alkyloxy group, and preferably represent a hydrogen atom or a phenyl group. Herein, $R_1$ and $R_2$ in Formulae (A) and (A) are synonymous with $R_1$ and $R_2$ in Formula (1).

Examples of the compound represented by Formula (A) include 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3,5-dimethylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene, and 9,9-bis(4-(2-hydroxyethoxy)-3-phenylphenyl)fluorene. Among them, 9,9-bis(4-(2-hydroxyethoxy)phenyl)fluorene can favorably be used.

According to the present invention, as a dihydroxy component, an aromatic dihydroxy compound or an aliphatic dihydroxy compound can be used in addition to the compound represented by Formula (A′).

Examples of the aromatic dihydroxy compound and the aliphatic dihydroxy compound include 2,2′-bis(2-hydroxyethoxy)-1,1′-binaphthalene [=BHEBN], 4,4-bis(4-hydroxyphenyl)propane [=bisphenol A], 1,1-bis(4-hydroxyphenyl)-1-phenylethane [=bisphenol AP], 2,2-bis(4-hydroxyphenyl)hexafluoropropane [=bisphenol AF], 2,2-bis(4-hydroxyphenyl)butane [=bisphenol B], bis(4-hydroxyphenyl)diphenylmethane [=bisphenol BP], bis(4-hydroxy-3-methylphenyl)propane [=bisphenol C], 1,1-bis(4-hydroxyphenyl)ethane [=bisphenol E], bis(4-hydroxyphenyl)methane [=bisphenol F], bis(2-hydroxyphenyl)methane, 2,2-bis(4-hydroxy-3-isopropylphenyl)propane [=bisphenol G], 1,3-bis(2-(4-hydroxyphenyl)-2-propyl)benzene [=bisphenol M], bis(4-hydroxyphenyl)sulfone [=bisphenol S], 1,4-bis(2-(4-hydroxyphenyl)-2-propyl)benzene [=bisphenol P], bis(4-hydroxy-3-phenylphenyl]propane [=bisphenol PH], 1,1-bis(4-hydroxyphenyl)-3,3,5-trimethylcyclohexane [=bisphenol TMC], 1,1-bis(4-hydroxyphenyl)cyclohexane [=bisphenol Z], 1,1-bis(4-hydroxy-3-methylphenyl)cyclohexane (bisphenol OCZ) and 4,4-bisphenol. Among these compounds, a particularly preferable compound is 2,2′-bis(2-hydroxyethoxy)-1,1′-binaphthalene [=BHEBN] represented by Formula (B) below.

Formula (B′)

Here, the repeating unit represented by Formula (B) above is a structural unit derived from a compound represented by Formula (B) above.

The polycarbonate resin of the present invention preferably contains the repeating unit represented by Formula (A) above and the repeating unit represented by Formula (B) above at a molar ratio of 10:90 to 90:10, and more preferably at a molar ratio of 30:70-70:30. If the repeating unit represented by Formula (B) above is contained within the above-described range, the refractive index is enhanced, the Abbe number is decreased, Tg is decreased and moldability is enhanced, which are favorable.

A preferable weight-average molecular weight (Mw) of the polycarbonate resin of the present invention in terms of polystyrene is 20,000-60,000. The weight-average molecular weight (Mw) in terms of polystyrene is more preferably 25,000-50,000, and particularly preferably 26,000-35,000.

Mw less than 20,000 is unfavorable since the molded article becomes brittle. Mw greater than 60,000 is unfavorable since the melt viscosity is increased and thus removal of the resin from the mold becomes difficult upon molding, and further fluidity is deteriorated which renders injection molding in a molten state difficult.

When the polycarbonate resin of the present invention is used for injection molding, a preferable glass transition temperature (Tg) is 95-180° C., more preferably 110-170° C., still more preferably 115-160° C., and particularly preferably 130-145° C. Tg lower than 95° C. is unfavorable since the usage temperature range will be narrowed. On the other hand, Tg exceeding 180° C. is unfavorable since the melting temperature of the resin is increased, and thus likely to cause decomposition and coloring of the resin. In a general mold temperature controller, a too high glass transition temperature of the resin increases the difference between the mold temperature and the glass transition temperature of the resin. Therefore, use of a resin with a too high glass transition temperature is difficult and thus unfavorable for a usage that requires strict surface precision of the product.

As an index of thermal stability to withstand heating upon injection molding, the 5% weight reduction temperature (Td) of the polycarbonate resin of the present invention as measured at a temperature raising rate of 10° C./min is preferably 350° C. or higher. 5% Weight reduction temperature lower than 350° C. is unfavorable since thermal decomposition upon molding is drastic and thus difficult to obtain a good molded article.

Phenol generated upon production and unreacted residual carbonate diester exist in the polycarbonate resin as impurities. The content of phenol in the polycarbonate resin is preferably 0.1-3000 ppm, more preferably 0.1-2000 ppm, and particularly preferably 1-1000 ppm, 1-800 ppm, 1-500 ppm or 1-300 ppm. The content of carbonate diester in the polycarbonate resin is preferably 0.1-1000 ppm, more preferably 0.1-500 ppm, and particularly preferably 1-100 ppm.

The amounts of phenol and carbonate diester contained in the polycarbonate resin can be adjusted to obtain a resin having physical properties of interest. The contents of phenol and carbonate diester can suitably be adjusted by altering the polycondensation conditions or apparatus. They can also be adjusted by altering the conditions for the extruding step after the polycondensation.

If the content of phenol or carbonate diester exceeds the above-mentioned range, problems may be caused such as deterioration of the strength of the resulting molded resin article or generation of an odor. On the other hand, if the content of phenol or carbonate diester falls below the above-described range, plasticity of the resin upon melting may possibly be deteriorated.

Furthermore, the polycarbonate resin of the present invention may be added with an antioxidant, a mold release agent, an ultraviolet absorber, a fluidity improving agent, a crystal nucleating agent, a reinforcing agent, a dye, an antistatic agent, an antibacterial agent or the like.

A polycarbonate resin of the present invention can be produced by subjecting a compound represented by Formula (A') and a carbonate precursor such as carbonate diester to a melt polycondensation method in the presence or absence of a basic compound catalyst, a transesterification catalyst or a mixed catalyst containing both.

Examples of carbonate diester used for this reaction include diphenyl carbonate, ditolyl carbonate, bis(chlorophenyl)carbonate, m-cresyl carbonate, dimethyl carbonate, diethyl carbonate, dibutyl carbonate and dicyclohexyl carbonate. Among them, diphenyl carbonate is particularly preferable. Carbonate diester is used preferably in a molar ratio of 0.97-1.05 and more preferably in a molar ratio of 0.98-1.04 per mole of the total moles of the dihydroxy compounds. If the amount of carbonate diester falls outside these ranges, problems such as a desired molecular weight of the resin cannot be reached, or unreacted starting material remains in the resin and deteriorates the optical characteristic, may be caused.

Examples of the basic compound catalyst particularly include alkali metal compounds, alkaline earth metal compounds and nitrogen-containing compounds.

Examples of the alkali metal compound include organic acid salts, inorganic salts, oxides, hydroxides, hydrides and alkoxides of alkali metals. Specifically, sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, phenylated boron sodium, sodium benzoate, potassium benzoate, cesium benzoate, lithium benzoate, disodium hydrogen phosphate, dipotassium hydrogen phosphate, dilithium hydrogen phosphate, disodium phenyl phosphate, disodium salt, dipotassium salt, dicesium salt or dilithium salt of bisphenol A, sodium salt, potassium salt, cesium salt or lithium salt of phenol, or the like can be used. Among them, sodium hydrogen carbonate is preferable which is commercially available with high catalytic activity and purity.

Examples of the alkaline earth metal compound include organic acid salts, inorganic salts, oxides, hydroxides, hydrides or alkoxides of alkaline earth metal compounds. Specifically, magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenyl phosphate, or the like can be used.

Examples of the nitrogen-containing compound include quaternary ammonium hydroxides and salts and amines thereof. Specifically, quaternary ammonium hydroxides having an alkyl group, an aryl group or the like, such as tetramethylammonium hydroxide, tetraethylammonium hydroxide, tetrapropylammonium hydroxide, tetrabutylammonium hydroxide and trimethylbenzylammonium hydroxide; tertiary amines such as triethylamine, dimethylbenzylamine and triphenylamine; secondary amines such as diethylamine and dibutylamine; primary amines such as propylamine and butylamine; imidazoles such as 2-methylimidazole, 2-phenylimidazole and benzimidazole; bases or basic salts of ammonia, tetramethylammonium borohydride, tetrabutylammonium borohydride, tetrabutylammonium tetraphenylborate and tetraphenylammonium tetraphenylborate; or the like can be used.

As the transesterification catalyst, a salt of zinc, tin, zirconium, lead or the like can preferably be used, where they may be used alone or in combination.

Specifically, zinc acetate, zinc benzoate, zinc 2-ethylhexanoate, tin (II) chloride, tin (IV) chloride, tin (II) acetate, tin (IV) acetate, dibutyltin dilaurate, dibutyltin oxide, dibutyltin dimethoxide, zirconium acetylacetonate, zirconium oxyacetate, zirconium tetrabutoxide, lead (II) acetate, lead (IV) acetate, or the like can be used as the transesterification catalyst.

These catalysts are used at a molar ratio of $1 \times 10^{-9}$ to $1 \times 10^{-3}$, preferably $1 \times 10^{-7}$ to $1 \times 10^{-4}$ per mole of the total moles of the dihydroxy compounds.

Two or more types of catalysts may be used in combination. Furthermore, the catalyst itself may directly be added, or it may be dissolved in water or a solvent such as phenol before being added.

According to the melt polycondensation method, melt polycondensation is carried out by using the above-described starting materials and catalyst while heating under ambient or reduced pressure while removing side products by transesterification reaction. The catalyst may be present from the beginning of the reaction together with the starting materials, or may be added during the reaction.

Melt polycondensation with the composition system of the present invention is carried out by a method in which a compound represented by Formula (A') and carbonate diester are melted in a reaction vessel and then polymerizing the generated monohydroxy compound while performing distillation. While the reaction temperature differs depending on the boiling point of the generated monohydroxy compound, it is usually in a range of 120-350° C. The pressure is reduced from the early point of the reaction and the reaction is completed by distilling the generated monohydroxy compound. In addition, a transesterification catalyst can also be used in order to promote the reaction.

The melt polycondensation reaction can be carried out in either continuous or batch mode. The reactor used for the reaction may be a vertical type equipped with anchor-shaped stirring blades, Maxblend stirring blades, helical ribbon-shaped stirring blades or the like, a horizontal type equipped with paddle blades, lattice blades, spectacle-shaped blades or the like, or an extruder type equipped with a screw. In addition, these reactors can favorably be used in a suitable combination according to the viscosity of the polymer.

According to the method for producing a polycarbonate resin of the present invention, the catalyst may be removed or deactivated after the polymerization reaction in order to retain heat stability and hydrolysis stability, although deactivation is not necessarily required. If the catalyst is to be deactivated, the catalyst can favorably be deactivated by carrying out a method of adding a known acidic substance. Specifically, as the acidic substance, an ester such as butyl benzoate; an aromatic sulfonic acid such as p-toluenesulfonic acid; an aromatic sulfonate ester such as butyl p-toluenesulfonic acid or hexyl p-toluenesulfonic acid; a phosphoric acid such as phosphorous acid, phosphoric acid or phosphonic acid; a phosphite ester such as triphenyl phosphite, monophenyl phosphite, diphenyl phosphite, diethyl phosphite, di-n-propyl phosphite, di-n-butyl phosphite, di-n-hexyl phosphite, dioctyl phosphite or monooctyl phosphite; a phosphate ester such as triphenyl phosphate, diphenyl phosphate, monophenyl phosphate, dibutyl phosphate, dioctyl phosphate or monooctyl phosphate; a phosphonic acid such as diphenyl phosphonate, dioctyl phosphonate or dibutyl phosphonate; a phosphonate ester such as diethyl phenyl phosphonate; a phosphine such as triphenyl phosphine or bis(diphenylphosphino)ethane; a boric acid such as a boric acid or phenylboric acid; an aromatic sulfonic acid salt such as dodecylbenzene sulfonate-tetrabutyl phosphonium salt; an organic halide such as stearic acid chloride, benzoyl chloride or p-toluenesulfonic acid chloride; an alkyl sulfate such as dimethyl sulfate; an organic halide such as benzyl chloride; or the like can favorably be used. In terms of the effect of the deactivating agent, stability against the resin and the like, butyl p-toluenesulfonic acid is particularly favorable. Such a deactivating agent can be used in an amount of 0.01-50 mol times and preferably 0.3-20 mol times the amount of the catalyst. If the deactivating agent is less than 0.01 mol times the catalyst amount, the deactivating effect would be inadequate which is unfavorable. On the other hand, if the deactivating agent is more than 50 mol times the catalyst amount, heat resistance of the resin is deteriorated and the molded body is likely to be colored, which are unfavorable.

The above-described deactivating agent can be added by kneading in either continuous or batch mode. The temperature upon kneading is preferably 200-350° C., more preferably 230-300° C. and particularly preferably 250-270° C. The kneading machine may favorably be an extruder in a case of a continuous mode and Labo Plastomill or a kneader in a case of a batch mode. Examples of the extruder include a single-screw extruder, a twin-screw extruder and a multi-screw extruder. The extruder may appropriately be provided with a gear pump or the like for stably quantifying the amount of the discharged resin. While the atmospheric pressure for melt kneading the resin composition is not particularly limited, ambient pressure or reduced pressure, for example, ambient pressure (760 mmHg) to a pressure of 0.1 mmHg, is preferable from the viewpoint of prevention of oxidation and removal of a decomposed matter, a low-boiling component such as phenol, or the like. While the extruder may be either a vent type no-vent type, it is preferably a vent-type extruder in terms of improving quality of the extruded product. While the pressure at the vent port (vent pressure) may be either ambient pressure or reduced pressure, it may be, for example, ambient pressure (760 mmHg) to a pressure of 0.1 mmHg, preferably a pressure of about 100-0.1 mmHg and more preferably a pressure of about 50-0.1 mmHg from the viewpoint of prevention of oxidation and removal of a decomposed matter, a low-boiling component such as phenol, or the like. Furthermore, hydrogenation/devolatilization may be carried out for the purpose of reducing a low-boiling component such as phenol more efficiently.

The deactivating agent can be kneaded immediately after the end of the polymerization reaction, or after pelletizing the polymerized resin. In addition, beside the deactivating agent, other additives (an antioxidant, a mold release agent, an ultraviolet absorber, a fluidity improving agent, a crystal nucleating agent, a reinforcing agent, a dye, an antistatic agent, an antibacterial agent, etc.) can also be added in a similar manner.

Following deactivation of the catalyst (at the end of the polymerization reaction if no deactivating agent is added), a step of devolatilizing and removing the low-boiling compound in the polymer under a pressure of 0.1-1 mmHg at a temperature of 200-350° C. may be provided. The temperature upon devolatilization and removal is preferably 230-300° C. and more preferably 250-270° C. For this step, a horizontal type device equipped with stirring blades that have excellent surface renewal capacity such as paddle blades, lattice blades, spectacle-shaped blades or the like, or a thin-film evaporator can preferably be used.

The content of foreign matters in the polycarbonate resin of the present invention is desirably as small as possible, and for which filtration of the molten starting material, filtration of the catalyst solution or the like can favorably be performed. The mesh of the filter is preferably 5 μm or less and more preferably 1 μm or less. Moreover, filtration of the generated resin can favorably be performed with a polymer filter. The mesh of the polymer filter is preferably 100 μm or less and more preferably 30 μm or less. Needless to say, the step of collecting the resin pellets should be carried out in a low dust environment, which is preferably Class 6 or lower and more preferably Class 5 or lower.

<Optical Lens>

Since an optical lens produced by using the polycarbonate resin composition of the present embodiment has a high refractive index and excellent heat resistance, it can be used in a field that conventionally employs an expensive high refractive index glass lens, for example, telescopes, binoculars, TV projectors or the like, which is extremely useful. If necessary, it is preferably used in a form of an aspherical lens. Since an aspherical lens is capable of correcting spherical aberration to be substantially zero with a single lens, there is no need of cancelling the spherical aberration with a combinational use of a plurality of spherical lenses, and thus reduction in weight and reduction in production cost can be realized. Accordingly, an aspherical lens is particularly useful as a camera lens among the optical lenses.

Furthermore, an optical lens is molded by an arbitrary method such as an injection molding method, a compression molding method or an injection compression molding method. The polycarbonate resin of the present embodiment can be used to acquire, in a simpler manner, an aspherical lens with a high refractive index and a low birefringence that is technically difficult to fabricate in a case of a glass lens.

In order to prevent a foreign matter from mixing into an optical lens, the molding environment should of course be a low dust environment, which is preferably Class 6 or lower and more preferably Class 5 or lower.

Furthermore, since the polycarbonate resin of the present embodiment has high fluidity, it can be made into an optical lens that has a thin, small-sized complex shape. As a specific lens size, the thickness at the center is 0.05-3.0 mm, more preferably 0.05-2.0 mm and still more preferably 0.1-2.0 mm. Moreover, the diameter is 1.0 mm-20.0 mm, more preferably 1.0-10.0 mm and still more preferably 3.0-10.0 mm. In addition, the lens is preferably a meniscus lens which is convexed on one surface and concaved on the other.

<Optical Film>

Since an optical film produced from the polycarbonate resin according to the present embodiment has excellent transparency and heat resistance, it can favorably be used as a film for a liquid crystal substrate, an optical memory card or the like.

In order to prevent a foreign matter from mixing into an optical film, the molding environment should of course be a low dust environment, which is preferably Class 6 or lower and more preferably Class 5 or lower.

<Polycarbonate Resin Composition>

The polycarbonate resin composition of the present invention may take a form of a resin composition containing multiple types of resins. Specifically, the polycarbonate resin composition comprises a polycarbonate resin containing at least the repeating unit represented by Formula (A) above for 1-99.5 wt %.

In addition to the polycarbonate resin of the present invention, the polycarbonate resin composition may also contain other resin as long as the characteristics of the present invention is not impaired. Examples of other resin that may be contained in the polycarbonate resin composition include the followings:

polyethylene, polypropylene, polyvinyl chloride, polystyrene, a (meth)acryl resin, an ABS resin, polyamide, polyacetal, polycarbonate (provided it is not the polycarbonate resin of the present invention), polyphenylene ether, polyester, polyphenylene sulfide, polyimide, polyethersulfone, polyether ether ketone, a fluorine resin, a cycloolefin polymer, an ethylene-vinyl acetate copolymer, an epoxy resin, a silicone resin, a phenol resin, an unsaturated polyester resin and polyurethane.

The content of other resin that may be contained in the polycarbonate resin composition is preferably 20 parts by mass or less and more preferably 10 parts by mass or less with respect to the total mass of the polycarbonate resin of the present invention. If the content of other resins is too much, compatibility may be deteriorated and transparency of the resin composition may be poor.

As impurities, phenol generated upon producing each resin used for constituting the composition and unreacted residual carbonate diester exist in the polycarbonate resin composition. The phenol content in the polycarbonate resin composition is preferably 0.1-3000 ppm, more preferably 0.1-2000 ppm, and particularly preferably 1-1000 ppm, 1-800 ppm, 1-500 ppm or 1-300 ppm. Moreover, the carbonate diester content in the polycarbonate resin composition is preferably 0.1-1000 ppm, more preferably 0.1-500 ppm, and particularly preferably 1-100 ppm. The amounts of phenol and carbonate diester contained in the polycarbonate resin composition can be adjusted to obtain a resin composition having physical properties of interest. The contents of phenol and carbonate diester can suitably be adjusted by altering the polycondensation conditions or apparatus. They can also be adjusted by altering the conditions of the extruding step after the polycondensation.

If the content of phenol or carbonate diester exceeds the above-mentioned range, problems may occur such as deterioration of the strength of the resulting molded resin article or generation of an odor. On the other hand, if the content of phenol or carbonate diester falls below the above-described range, plasticity of the resin upon melting may possibly be deteriorated.

EXAMPLES

Hereinafter, the present embodiment will be described in more detail by way of examples, although the present invention should not be limited to these examples.

<Weight-Average Molecular Weight (Mw) in Terms of Polystyrene>

Gel permeation chromatograph (GPC) was employed to generate a calibration curve, using tetrahydrofuran as a developing solvent and a standard polystyrene having a known molecular weight (molecular weight distribution=1). Based on this calibration curve, Mw of the polycarbonate resins obtained below were calculated from retention time of GPC.

<Measurement of Oligomer Content>

Preparation of Analytical Sample:

3 g of a sample was dissolved in 30 ml of dichiromethane, dropped in 250 ml of acetone, and stirred to reprecipitate the resin component. The precipitate was filtrated with No. 5C filter paper, and the solvent was removed from the filtrate with an evaporator to obtain a solid containing the oligomer. To this solid, 6 mL of acetone was added to dissolve the solid containing the oligomer, and 6 ml of acetonitrile was further added to give an analytical sample.

Generation of Calibration Curve:

To 100 mg of 9,9-bis(4-(2-hydroxyethoxy)phenyl)fluorene (BPEF), acetonitrile/water=1/1 was added to give a constant volume of 50 ml. This was used as a standard stock solution, and appropriately diluted with a solution of acetonitrile/water=1/1 to prepare 40, 100, 200, 400 and 800 μg/ml standard solutions as BPEF, which were subjected to LC-MS analysis. The generated calibration curve was used to quantify analytical samples.

LC-MS Analysis Conditions:

Instrument: LC-Tof-MS (XevoG2-S) from Waters
Scanning range: 80-2000, 400-4000
Scanning speed: 0.5 sec/scan
Ionization method: ESI (+)
Capillary voltage: 3 kV
Sampling cone voltage: 60V
Source temperature: 120° C.
Desolvation temperature: 350° C.
Column: AQUITY UPLC BEH C18 1.7 μm, inner diameter 2.1 mm, length 100 mm
Eluent: Acetonitrile/$H_2O$/2-propanol=80/20/0–>20 min–>60/15/25 (10 min hold)
Flow rate: 0.4 ml/min
Injected amount: 1 μL
Detected wavelength: 210-400 nm
Temperature: 40° C.

<Linear Expansion Coefficient>

Measurement was carried out using a thermomechanical analyzer (TMA 100) from Seiko Instruments and Electronics Ltd. following JIS K7197 under the conditions at a load of 50 mN and a temperature raising rate of 10° C./min to obtain an average linear expansion rate between 30° C. and 50° C.

Example 1

19.260 kg (43.921 mol) of 9,9-bis(4-(2-hydroxyethoxy)phenyl)fluorene (hereinafter, sometimes abbreviated as "BPEF") having the following structure, 9.780 kg (45.655 mol) of diphenyl carbonate (hereinafter, sometimes abbreviated as "DPC"), and 2.21×10$^{-2}$ g (2.63×10$^{-4}$ mol) of sodium hydrogen carbonate were placed into a 50-liter reactor equipped with a stirring machine and a distillation device, subjected to nitrogen replacement, and heated to 205° C. and stirred under a nitrogen atmosphere of 760 Torr for an hour.

Figure 1:
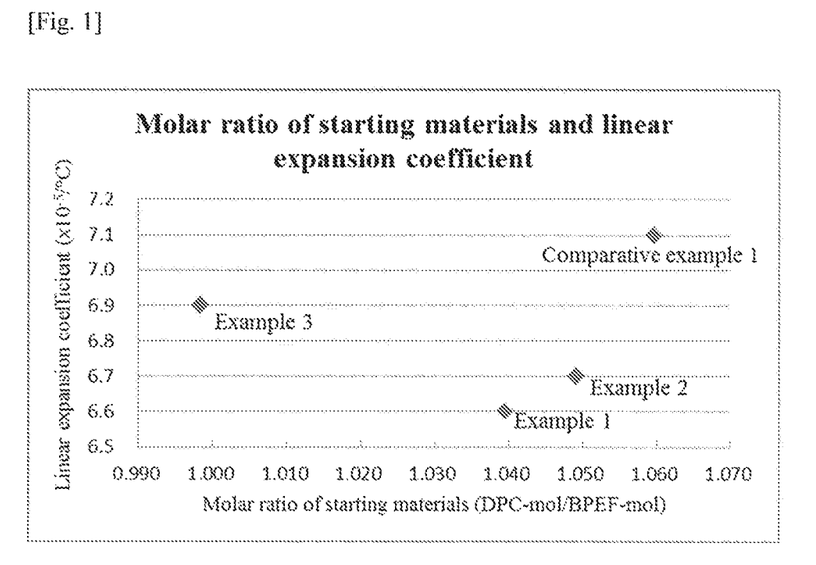
FIG. 1 A graph showing the relationship between the molar ratios of the starting materials used in Examples 1-3 and Comparative example 1 (diphenyl carbonate/9,9-bis(4-(2-hydroxyethoxy)phenyl)fluorene) and the linear expansion coefficients of the resulting polycarbonate resins.
Figure 2:
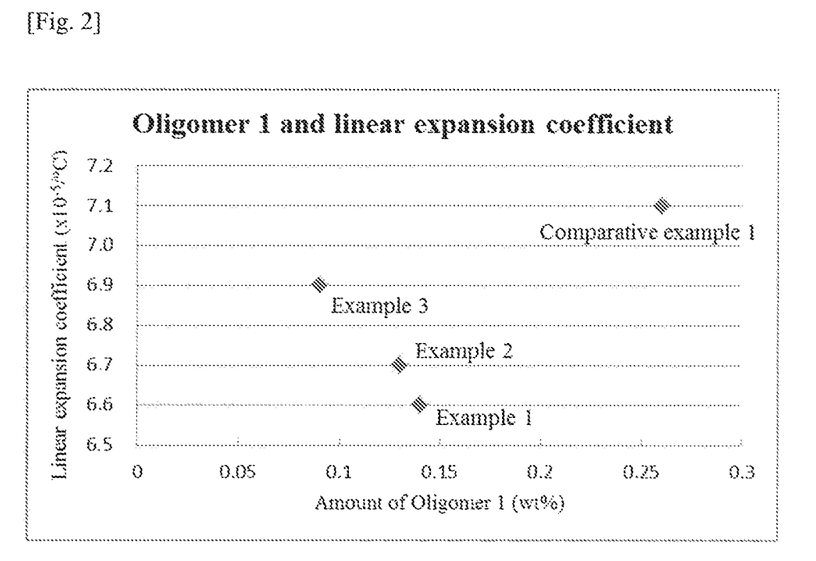
FIG. 2 A graph showing the relationship between the amounts of Oligomer 1 (an oligomer represented by Formula (1)) contained in the polycarbonate resins obtained in Examples 1-3 and Comparative example 1 and the linear expansion coefficients of said polycarbonate resins.
Figure 3:
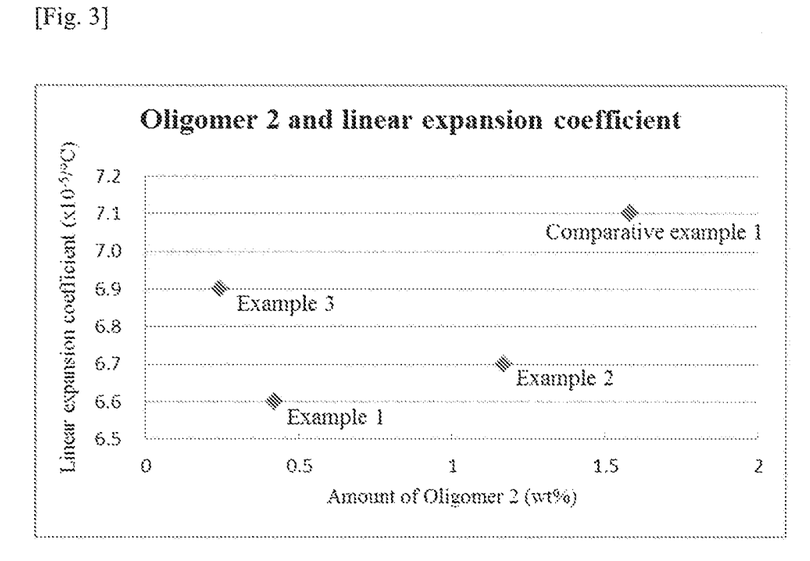
FIG. 3 A graph showing the relationship between the amounts of Oligomer 2 (an oligomer represented by Formula (2)) contained in the polycarbonate resins obtained in Examples 1-3 and Comparative example 1 and the linear expansion coefficients of said polycarbonate resins.
Figure 4:
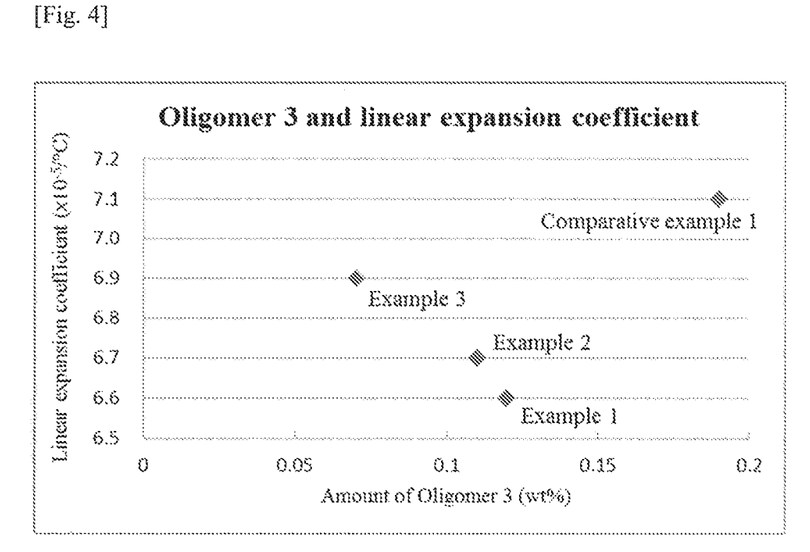
FIG. 4 A graph showing the relationship between the amounts of Oligomer 3 (an oligomer represented by Formula (3)) contained in the polycarbonate resins obtained in Examples 1-3 and Comparative example 1 and the linear expansion coefficients of said polycarbonate resins.
Figure 5:
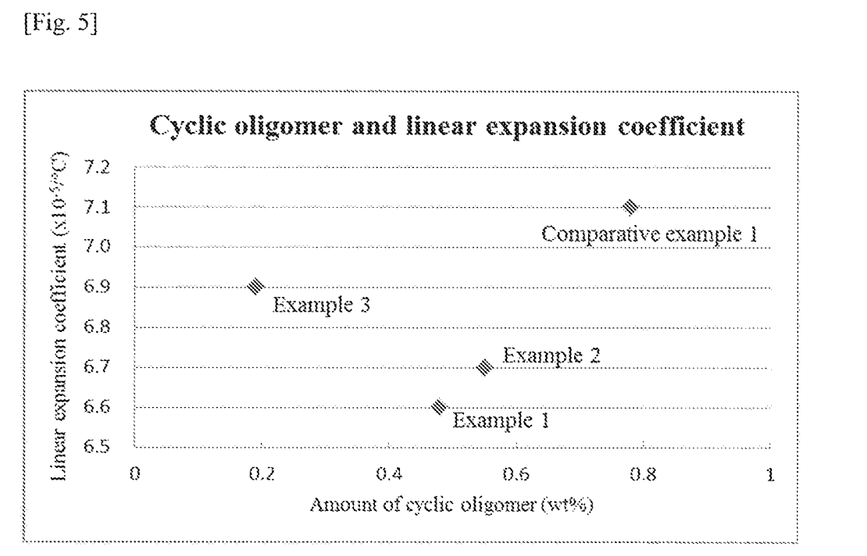
FIG. 5 A graph showing the relationship between the amounts of the cyclic oligomer (an oligomer represented by Formula (4)) contained in the polycarbonate resins obtained in Examples 1-3 and Comparative example 1 and the linear expansion coefficients of said polycarbonate resins.
Figure 6:
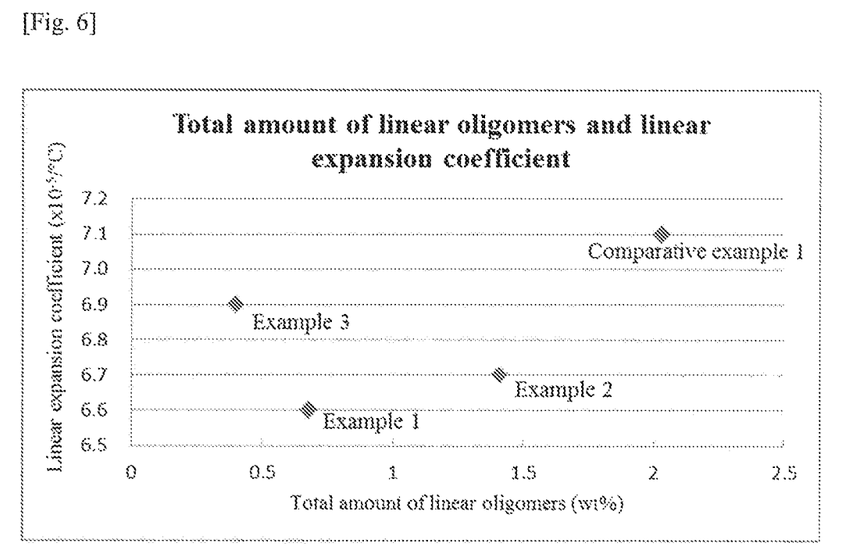
FIG. 6 A graph showing the relationship between the total amounts of the linear oligomers (the total amount of the oligomers represented by Formulae (1)-(3)) contained in the polycarbonate resins obtained in Examples 1-3 and Comparative example 1 and the linear expansion coefficients of said polycarbonate resins.

Following complete dissolution of the starting materials, the pressure reduction degree was adjusted to 150 Torr by spending 15 minutes, and maintained under the conditions of 205° C. and 150 Torr for 20 minutes to allow transesterification reaction. The temperature was further increased to 240° C. at a rate of 37.5° C./hr, and maintained under the conditions of 240° C. and 150 Torr for 10 minutes. Thereafter, the pressure was adjusted to 120 Torr by spending 10 minutes, and maintained at 240° C. and 120 Torr for 70 minutes. Then, the pressure was adjusted to 100 Torr by spending 10 minutes, and maintained at 240° C. and 100 Torr for 10 minutes. The pressure was adjusted to 1 Torr or less by spending another 40 minutes to allow polymerization reaction under the conditions of 240° C. and 1 Torr for 10 minutes while stirring. At the end of the reaction, nitrogen was blown into the reactor for pressurization to discharge the generated polycarbonate resin while pelletizing. Mw, amounts of the respective oligomers and linear expansion coefficient of the resulting resin are shown in Table 1. Specific amounts of the respective oligomers, namely, the contents with respect to the values of n, m, l and k in Formulae (1)-(4) are shown in Table 2. In addition, the relationship between the molar ratio of the starting materials used and the linear expansion coefficient is shown in FIG. 1, while the relationship between the amounts of the respective oligomers and the linear expansion coefficient are shown in FIGS. 2-6.

Example 2

A polycarbonate resin was obtained in the same manner as Example 1 except that the amounts were changed as follows: 20.040 kg (45.700 mol) of BPEF, 10.271 kg (47.947 mol) of DPC and $2.30 \times 10^{-2}$ g ($2.74 \times 10^{-4}$ mol) of sodium hydrogen carbonate. Mw, amounts of the respective oligomers and linear expansion coefficient of the resulting resin are shown in Table 1. Specific amounts of the respective oligomers, namely, the contents with respect to the values of n, m, l and k in Formulae (1)-(4) are shown in Table 2. In addition, the relationship between the molar ratio of the starting materials used and the linear expansion coefficient is shown in FIG. 1 while the relationship between the amounts of the respective oligomers and the linear expansion coefficient are shown in FIGS. 2-6.

Example 3

A polycarbonate resin was obtained in the same manner as Example 1 except that the amounts were changed as follows: 18.700 kg (42.644 mol) of BPEF, 9.120 kg (42.574 mol) of DPC and $2.21 \times 10^{-2}$ g ($2.56 \times 10^{-4}$ mol) of sodium hydrogen carbonate. Mw, amounts of the respective oligomers and linear expansion coefficient of the resulting resin are shown in Table 1. Specific amounts of the respective oligomers, namely, the contents with respect to the values of n, m, l and k in Formulae (1)-(4) are shown in Table 2. In addition, the relationship between the molar ratio of the starting materials used and the linear expansion coefficient is shown in FIG. 1 while the relationship between the amounts of the respective oligomers and the linear expansion coefficient are shown in FIGS. 2-6.

Comparative Example 1

A polycarbonate resin was obtained in the same manner as Example 1 except that the amounts were changed as follows: 18.700 kg (42.644 mol) of BPEF, 9.68 kg (45.188 mol) of DPC and $2.21 \times 10^{-2}$ g ($2.56 \times 10^{-4}$ mol) of sodium hydrogen carbonate. Mw, amounts of the respective oligomers and linear expansion coefficient of the resulting resin are shown in Table 1. Specific amounts of the respective oligomers, namely, the contents with respect to the values of n, m, l and k in Formulae (1)-(4) are shown in Table 2. In addition, the relationship between the molar ratio of the starting materials used and the linear expansion coefficient is shown in FIG. 1 while the relationship between the amounts of the respective oligomers and the linear expansion coefficient are shown in FIGS. 2-6.

TABLE 1

| | BPEF | | DPC | | Molar ratio DPC-mol/ | | Oligomer 1 | Oligomer 2 | Oligomer 3 | Total amount of linear oligomers | Cyclic oligomer | Linear expansion co-efficient × $10^{-5}$/ |
|---|---|---|---|---|---|---|---|---|---|---|---|---|
| | Kg | mol | kg | mol | BPEF-mol | Mw | wt % | wt % | wt % | wt % | wt % | ° C. |
| Example 1 | 19.260 | 43.921 | 9.780 | 45.655 | 1.039 | 29100 | 0.14 | 0.42 | 0.12 | 0.68 | 0.48 | 6.6 |
| Example 2 | 20.040 | 45.700 | 10.271 | 47.947 | 1.049 | 29000 | 0.13 | 1.16 | 0.11 | 1.40 | 0.55 | 6.7 |
| Example 3 | 18.700 | 42.644 | 9.120 | 42.574 | 0.998 | 25100 | 0.09 | 0.24 | 0.07 | 0.40 | 0.19 | 6.9 |
| Comparative example 1 | 18.700 | 42.644 | 9.680 | 45.188 | 1.060 | 25000 | 0.26 | 1.58 | 0.19 | 2.03 | 0.78 | 7.1 |

Oligomer 1: Oligomer represented by Formula (1)
Oligorner 2: Oligomer represented by Formula (2)
Oligomer 3: Oligomer represented by Formula (3)
Total amount of linear oligomers : Total amount of oligomers represented by Formulae (1)-(3)
Cyclic oligomer: Oligomer represented by Formula (4)

TABLE 2

| | | n | wt % | | m | wt % | | l | wt % | | k | wt % |
|---|---|---|---|---|---|---|---|---|---|---|---|---|
| Example 1 | Formula (1) Oligomer 1 | 1 | 0.020 | Formula (2) Oligomer 2 | 1 | 0.070 | Formula (3) Oligomer 3 | 1 | 0.030 | Formula (4) Oligomer 4 | 2 | 0.340 |
| | | 2 | 0.030 | | 2 | 0.110 | | 2 | 0.050 | | 3 | 0.100 |
| | | 3 | 0.060 | | 3 | 0.100 | | 3 | 0.040 | | 4 | 0.040 |
| | | 4 | 0.030 | | 4 | 0.070 | | 4 | 0.002 | | Total | 0.480 |
| | | Total | 0.140 | | 5 | 0.050 | | 5 | 0.002 | | | |
| | | | | | 6 | 0.020 | | Total | 0.124 | | | |
| | | | | | Total | 0.420 | | | | | | |
| Example 2 | Formula (1) Oligomer 1 | 1 | 0.020 | Formula (2) Oligomer 2 | 1 | 0.200 | Formula (3) Oligomer 3 | 1 | 0.030 | Formula (4) Oligomer 4 | 2 | 0.390 |
| | | 2 | 0.020 | | 2 | 0.300 | | 2 | 0.040 | | 3 | 0.110 |
| | | 3 | 0.060 | | 3 | 0.280 | | 3 | 0.040 | | 4 | 0.050 |
| | | 4 | 0.030 | | 4 | 0.200 | | 4 | 0.002 | | Total | 0.550 |
| | | Total | 0.130 | | 5 | 0.120 | | 5 | 0.002 | | | |
| | | | | | 6 | 0.060 | | Total | 0.114 | | | |
| | | | | | Total | 1.160 | | | | | | |
| Example 3 | Formula (1) Oligomer 1 | 1 | 0.010 | Formula (2) Oligomer 2 | 1 | 0.020 | Formula (3) Oligomer 3 | 1 | 0.020 | Formula (4) Oligomer 4 | 2 | 0.140 |
| | | 2 | 0.030 | | 2 | 0.050 | | 2 | 0.030 | | 3 | 0.030 |
| | | 3 | 0.050 | | 3 | 0.080 | | 3 | 0.020 | | 4 | 0.020 |
| | | 4 | 0.010 | | 4 | 0.050 | | 4 | 0.000 | | Total | 0.190 |
| | | Total | 0.090 | | 5 | 0.030 | | 5 | 0.000 | | | |
| | | | | | 6 | 0.010 | | Total | 0.070 | | | |
| | | | | | Total | 0.240 | | | | | | |
| Comparative example 1 | Formula (1) Oligomer 1 | 1 | 0.040 | Formula (2) Oligomer 2 | 1 | 0.350 | Formula (3) Oligomer 3 | 1 | 0.050 | Formula (4) Oligomer 4 | 2 | 0.450 |
| | | 2 | 0.050 | | 2 | 0.450 | | 2 | 0.080 | | 3 | 0.230 |
| | | 3 | 0.100 | | 3 | 0.290 | | 3 | 0.060 | | 4 | 0.100 |
| | | 4 | 0.070 | | 4 | 0.220 | | 4 | 0.000 | | Total | 0.780 |
| | | Total | 0.260 | | 5 | 0.170 | | 5 | 0.000 | | | |
| | | | | | 6 | 0.100 | | Total | 0.190 | | | |
| | | | | | Total | 1.580 | | | | | | |

The linear expansion coefficients of the polycarbonate resins obtained in Examples 1-3 were as low as $6.6 \times 10^{-5}$ to $6.9 \times 10^{-5}/°$ C., showing excellent thermal stability. On the other hand, the linear expansion coefficient of the polycarbonate resin obtained in Comparative example 1 was as high as $7.1 \times 10^{-5}/°$ C., showing inferior thermal stability as compared to the polycarbonate resins obtained in Examples 1-3. As can be appreciated from FIG. 1 of the present application, the molar ratio of the starting materials (diphenyl carbonate/ 9,9-bis(4-(2-hydroxyethoxy)phenyl)fluorene) is preferably 1.05 or less. As can be appreciated from FIG. 6 of the present application, the total content of the linear oligomers represented by Formulae (1)-(3) is preferably 1.5 wt % or less. Moreover, as can be appreciated from FIG. 5 of the present application, the content of the cyclic oligomer represented by Formula (4) is preferably 0.6 wt % or less.

Example 4

A polycarbonate resin was obtained in the same manner as Example 1 except that the amounts were changed as follows: 9.630 kg (21.961 mol) of BPEF, 9.650 kg (45.048 mol) of DPC and $2.21 \times 10^{-2}$ g ($2.63 \times 10^{-4}$ mol) of sodium hydrogen carbonate, and that 8.000 kg (21.365 mol) of 2,2'-bis(2-hydroxyethoxy)-1,1'-binaphthalene having the following structure (hereinafter, sometimes abbreviated as "BHEBN") was further added. Mw, amounts of the respective oligomers and linear expansion coefficient of the resulting resin are shown in Table 3.

Example 5

Example 5

A polycarbonate resin was obtained in the same manner as Example 4 except that the amounts were changed as follows: 10.500 kg (23.945 mol) of BPEF, 10.110 kg (27.000 mol) of BHEBN, 11.4600 kg (53.497 mol) of DPC and $2.21 \times 10^{-2}$ g ($2.63 \times 10^{-4}$ mol) of sodium hydrogen carbonate. Mw, amounts of the respective oligomers and linear expansion coefficient of the resulting resin are shown in Table 3.

Example 6

A polycarbonate resin was obtained in the same manner as Example 4 except that the amounts were changed as follows: 9.120 kg (20.798 mol) of BPEF, 10.000 kg (26.707 mol) of BHEBN, 10.170 kg (47.475 mol) of DPC and $2.21 \times 10^{-2}$ g ($2.63 \times 10^{-4}$ mol) of sodium hydrogen carbonate. Mw, amounts of the respective oligomers and linear expansion coefficient of the resulting resin are shown in Table 3.

TABLE 3

| | BPEF | | BHEBN | | DPC | | Molar ratio DPC-mol/ Di-hydroxy com-pound- | | Oli-gomer 1 | Oli-gomer 2 | Oli-gomer 3 | Total amount of linear oli-gomers | Cyclic oli-gomer | Linear expansion co-efficient × $10^{-5}$/ |
|---|---|---|---|---|---|---|---|---|---|---|---|---|---|---|
| | kg | mol | kg | mol | kg | mol | mol | Mw | wt % | wt % | wt % | wt % | wt % | ° C. |
| Example 4 | 9.630 | 21.961 | 8.000 | 21.365 | 9.650 | 45.048 | 1.040 | 29100 | 0.07 | 0.20 | 0.07 | 0.34 | 0.22 | 6.6 |
| Example 5 | 10.500 | 23.945 | 10.110 | 27.000 | 11.460 | 53.497 | 1.050 | 29000 | 0.07 | 0.59 | 0.05 | 0.71 | 0.26 | 6.7 |
| Example 6 | 9.120 | 20.798 | 10.000 | 26.707 | 10.170 | 47.475 | 0.999 | 25100 | 0.05 | 0.11 | 0.04 | 0.20 | 0.10 | 6.9 |

Example 7

A polycarbonate resin was obtained in the same manner as Example 4 except that 13.000 kg (22.007 mol) of 9,9-bis (4-(2-hydroxyethoxy)-3-phenylphenyl)fluorene having the following structure (hereinafter, sometimes abbreviated as "BPPEF") was used instead of BPEF, and that the amounts were changed as follows: 8.000 kg (21.365 mol) of BHEBN, 9.650 kg (45.048 mol) of DPC and $2.21 \times 10^{-2}$ g ($2.63 \times 10^{-4}$ mol) of sodium hydrogen carbonate. Mw, amounts of the respective oligomers and linear expansion coefficient of the resulting resin are shown in Table 4.

Example 8

A polycarbonate resin was obtained in the same manner as Example 7 except that the amounts were changed as follows: 14.200 kg (24.038 mol) of BPPEF, 10.110 kg (27.000 mol) of BHEBN, 11.460 kg (53.497 mol) of DPC and $2.21 \times 10^{-2}$ g ($2.63 \times 10^{-4}$ mol) of sodium hydrogen carbonate. Mw, amounts of the respective oligomers and linear expansion coefficient of the resulting resin are shown in Table 4.

Example 9

A polycarbonate resin was obtained in the same manner as Example 7 except that the amounts were changed as follows: 12.300 kg (20.822 mol) of BPPEF, 10.000 kg (26.707 mol) of BHEBN, 10.170 kg (47.475 mol) of DPC and $2.21 \times 10^{-2}$ g ($2.63 \times 10^{-4}$ mol) of sodium hydrogen carbonate. Mw, amounts of the respective oligomers and linear expansion coefficient of the resulting resin are shown in Table 4.

TABLE 4

| | BPEF | | BHEBN | | DPC | | Molar ratio DPC-mol/ Di-hydroxy com-pound- | | Oli-gomer 1 | Oli-gomer 2 | Oli-gomer 3 | Total amount of linear oli-gomers | Cyclic oli-gomer | Linear expansion co-efficient × $10^{-5}$/ |
|---|---|---|---|---|---|---|---|---|---|---|---|---|---|---|
| | kg | mol | kg | mol | kg | mol | mol | Mw | wt % | wt % | wt % | wt % | wt % | ° C. |
| Example 7 | 13.000 | 22.007 | 8.000 | 21.365 | 9.650 | 45.048 | 1.039 | 29100 | 0.08 | 0.21 | 0.08 | 0.37 | 0.21 | 6.6 |
| Example 8 | 14.200 | 24.038 | 10.110 | 27.000 | 11.460 | 53.497 | 1.048 | 29000 | 0.08 | 0.60 | 0.06 | 0.74 | 0.25 | 6.7 |
| Example 9 | 12.300 | 20.822 | 10.000 | 26.707 | 10.170 | 47.475 | 0.999 | 25100 | 0.06 | 0.12 | 0.03 | 0.21 | 0.09 | 6.9 |

<Evaluation of Optical Lens>

The polycarbonate resins obtained in Examples 1-9 and Comparative example 1 were used respectively to fabricate four-lens units, which were evaluated by visually observing their resolutions with a resolution projector (from Pearl Optical Industry Co., Ltd., RPT-201T). More specifically, each of the polycarbonate resins obtained in Examples 1-9 and Comparative example 1 was subjected to injection molding using an injection molding machine ROBOSHOT S-2000i30A from FANUC Corporation to give a meniscus lens with a diameter of 4.7 mm and a thickness of 0.6 mm. This molded piece was inserted into the second lens of the four-lens unit. The lens unit heated to 30° C. and 100° C. and then cooled to 30° C. was mounted on the resolution projector to visually evaluate the resolution. Evaluations were as follows: a circle represents no change in the resolution, a triangle represents blurred periphery, and a cross represents a significant image blur over the whole area. As a result, the optical lenses made from the polycarbonate resins obtained in Examples 1, 2, 4, 5, 7 and 8 gave circles, the optical lenses made from the polycarbonate resins obtained in Examples 3, 6 and 9 gave triangles, and the optical lens made from the polycarbonate resin obtained in Comparative example 1 gave a cross.

INDUSTRIAL APPLICABILITY

Since the polycarbonate resin of the present invention is associated with small thermal expansion (small linear expansion coefficient), it is useful as an optical material for an optical film, an optical lens and else.

The invention claimed is:

1. A method for adjusting a total volume of oligomers represented by Formulae (1)-(4) below contained in a polycarbonate resin to be 2.5 wt % or less, wherein the polycarbonate resin contains a repeating unit represented by Formula (A) below in an amount of 1-99.5 wt %:

Formula (A)

(in Formula (A), $R_1$ and $R_2$ each independently represent a hydrogen atom, a phenyl group, a C1-6 alkyl group or a C1-6 alkyloxy group)

Formula (1)

(in Formula (1), $R_1$ and $R_2$ each independently represent a hydrogen atom, a phenyl group, a C1-6 alkyl group or a C1-6 alkyloxy group, and n represents an integer of 1-4)

Formula (2)

(in Formula (2), $R_1$ and $R_2$ each independently represent a hydrogen atom, a phenyl group, a C1-6 alkyl group or a C1-6 alkyloxy group, and m represents an integer or 1-6)

Formula (3)

(in Formula (3), $R_1$ and $R_2$ each independently represent a hydrogen atom, a phenyl group, a C1-6 alkyl group or a C1-6 alkyloxy group, and l represents an integer of 1-5)

Formula (4)

(in Formula (4), $R_1$ and $R_2$ each independently represent a hydrogen atom, a phenyl group, a C1-6 alkyl group or a C1-6 alkyloxy group, and k represents an integer of 2-4).

2. The method according to claim 1, wherein $R_1$ and $R_2$ in Formula (A) each independently represent a hydrogen atom or a phenyl group.

3. The method according to claim 1, wherein the total volume of oligomers represented by Formulae (1)-(4) above is 0.6 wt % or more.

4. The method according to claim 1, wherein the total content of the linear oligomers represented by Formulae (1)-(3) above is 1.5 wt % or less, and the content of the cyclic oligomer represented by Formula (4) above is 0.6 wt % or less.

5. The method according to claim 1, wherein the polycarbonate resin further comprises a repeating unit represented by Formula (B) below:

Formula (B)

6. The method according to claim 5, wherein the polycarbonate resin comprises the repeating unit represented by Formula (A) above and the repeating unit represented by Formula (B) above at a molar ratio of 10:90 to 90:10.

7. The method according to claim 1, wherein the polycarbonate resin has a linear expansion coefficient of from $6.5 \times 10^{-5}$ to $7.0 \times 10^{-5}$/° C.

\* \* \* \* \*